(12) United States Patent
Walters et al.

(10) Patent No.: US 11,818,364 B2
(45) Date of Patent: *Nov. 14, 2023

(54) GAZE-TRACKING-BASED IMAGE DOWNSCALING FOR MULTI-PARTY VIDEO COMMUNICATION

(71) Applicant: Capital One Services, LLC, McLean, VA (US)

(72) Inventors: Austin Walters, Savoy, IL (US); Alvin Hua, McLean, VA (US); Anh Truong, Champaign, IL (US); Vincent Pham, Seattle, WA (US); Ernest Kwak, Urbana, IL (US); Galen Rafferty, Mahomet, IL (US); Jeremy Goodsitt, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/684,153

(22) Filed: Mar. 1, 2022

(65) Prior Publication Data
US 2022/0191515 A1 Jun. 16, 2022

Related U.S. Application Data

(63) Continuation of application No. 17/086,265, filed on Oct. 30, 2020, now Pat. No. 11,297,332.

(51) Int. Cl.
| | | |
|---|---|---|
| H04N 7/14 | (2006.01) | |
| H04N 19/162 | (2014.01) | |
| H04L 65/80 | (2022.01) | |
| H04L 65/403 | (2022.01) | |
| H04N 19/172 | (2014.01) | |

(Continued)

(52) U.S. Cl.
CPC ......... *H04N 19/162* (2014.11); *H04L 65/403* (2013.01); *H04L 65/80* (2013.01); *H04N 19/115* (2014.11); *H04N 19/167* (2014.11); *H04N 19/172* (2014.11); *G06T 3/4046* (2013.01); *G06T 9/002* (2013.01)

(58) Field of Classification Search
None
See application file for complete search history.

(56) References Cited

U.S. PATENT DOCUMENTS 10,523,914 B1 * 12/2019 Phillips ............ H04N 21/21805
11,297,332 B1 * 4/2022 Walters ................. H04N 19/59

(Continued)

*Primary Examiner* — Quoc D Tran
(74) *Attorney, Agent, or Firm* — Perkins Coie LLP

(57) ABSTRACT

In some embodiments, gaze-tracking-based image downscaling for multi-party video communication may be provided. In some embodiments, a set of gaze locations may be received from a set of receiving devices during concurrent video communication sessions between the receiving devices and a sending device. Different collections of positions may be determined based on the gaze locations, and, for each such collection, a spatial indicator (e.g., a bounded region) may be determined. A first downscaled encoding of the source image (from the sending device) may be generated based on the first spatial indicator, and a second downscaled encoding of the source image may be generated based on the second spatial indicator, etc. The downscaled encodings may then be sent to the respective receiving devices during the concurrent video communication sessions.

20 Claims, 4 Drawing Sheets

(51) Int. Cl.
    *H04N 19/115*     (2014.01)
    *H04N 19/167*     (2014.01)
    *G06T 3/40*     (2006.01)
    *G06T 9/00*     (2006.01)

(56) References Cited

U.S. PATENT DOCUMENTS

| | | | | |
|---|---|---|---|---|
| 2008/0297589 | A1* | 12/2008 | Kurtz | H04N 7/15 |
| | | | | 348/E7.083 |
| 2018/0302556 | A1* | 10/2018 | Baran | H04N 19/167 |
| 2020/0058152 | A1* | 2/2020 | Zhang | G06F 3/011 |
| 2020/0107060 | A1* | 4/2020 | Khan | H04W 72/542 |

\* cited by examiner

GAZE-TRACKING-BASED IMAGE DOWNSCALING FOR MULTI-PARTY VIDEO COMMUNICATION

CROSS-REFERENCE TO RELATED APPLICATIONS

This application is a continuation of U.S. patent application Ser. No. 17/086,265, filed Oct. 30, 2020. The content of the foregoing application is incorporated herein in its entirety by reference.

FIELD

The invention relates to computer networks, and more specifically to updating data being transferred across a computer network.

BACKGROUND

Multi-party video communication sessions (e.g., video conferences) enable users to communicate with one another while providing a more engaging environment, as compared to traditional phone calls or email conversations. Due to the amount of bandwidth typically necessary to transfer video streams over the Internet, common technical issues may be encountered during video communication sessions. Such issues include freezing video or audio, choppy video or audio, screen-share failure, or long delays. The likelihood and frequency of such technical issues tend to increase as the number of users in a multi-party video communication session increases. Although each video stream may be downscaled in their entirety to address the foregoing issues, such downscaling typically results in poor video quality, thereby leading to poor user experiences with video communication.

SUMMARY

Aspects of the invention relate to methods, apparatuses, media, and/or systems for gaze-tracking-based image downscaling for multi-party video communication, in accordance with some embodiments.

In some embodiments, a first gaze location may be received from a first receiving computing device, and a second gaze location may be received from a second receiving computing device, and a third gaze location may be received from a third receiving computing device, and a fourth gaze location may be received from a fourth receiving computing device during concurrent video communication sessions between the first, second, third, and fourth receiving computing devices and a sending computing device that is providing a source image. A first cluster of gaze locations and a second cluster of gaze locations may be determined, where the first cluster of gaze locations includes the first gaze location and the second gaze location, and where the second cluster of gaze locations includes the third gaze location and the fourth gaze location. A first mask including a first region based on the first cluster of gaze locations and a second mask including a second region based on the second cluster of gaze locations may be generated. A first downscaled encoding of the source image may be generated based on the first mask by downscaling a third region of the source image outside of the first region. A second downscaled encoding of the source image may be generated based on the second mask by downscaling a fourth region of the source image outside of the second region. The first downscaled encoding may be sent to the first and second receiving computing devices and the second downscaled encoding to the third and fourth receiving computing devices during the concurrent video communication sessions.

In some embodiments, a set of positions may be received from a set of computing devices during concurrent video communication sessions between the set of computing devices and a sending computing device that is providing a first image. A collection of positions may be determined based on the set of positions. A spatial indicator may be determined based on the collection of positions. A downscaled encoding of the first image may be generated by downscaling a portion of the first image that does not comprise the spatial indicator. The downscaled encoding may be sent to the set of computing devices during the concurrent video communication sessions.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION OF THE INVENTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
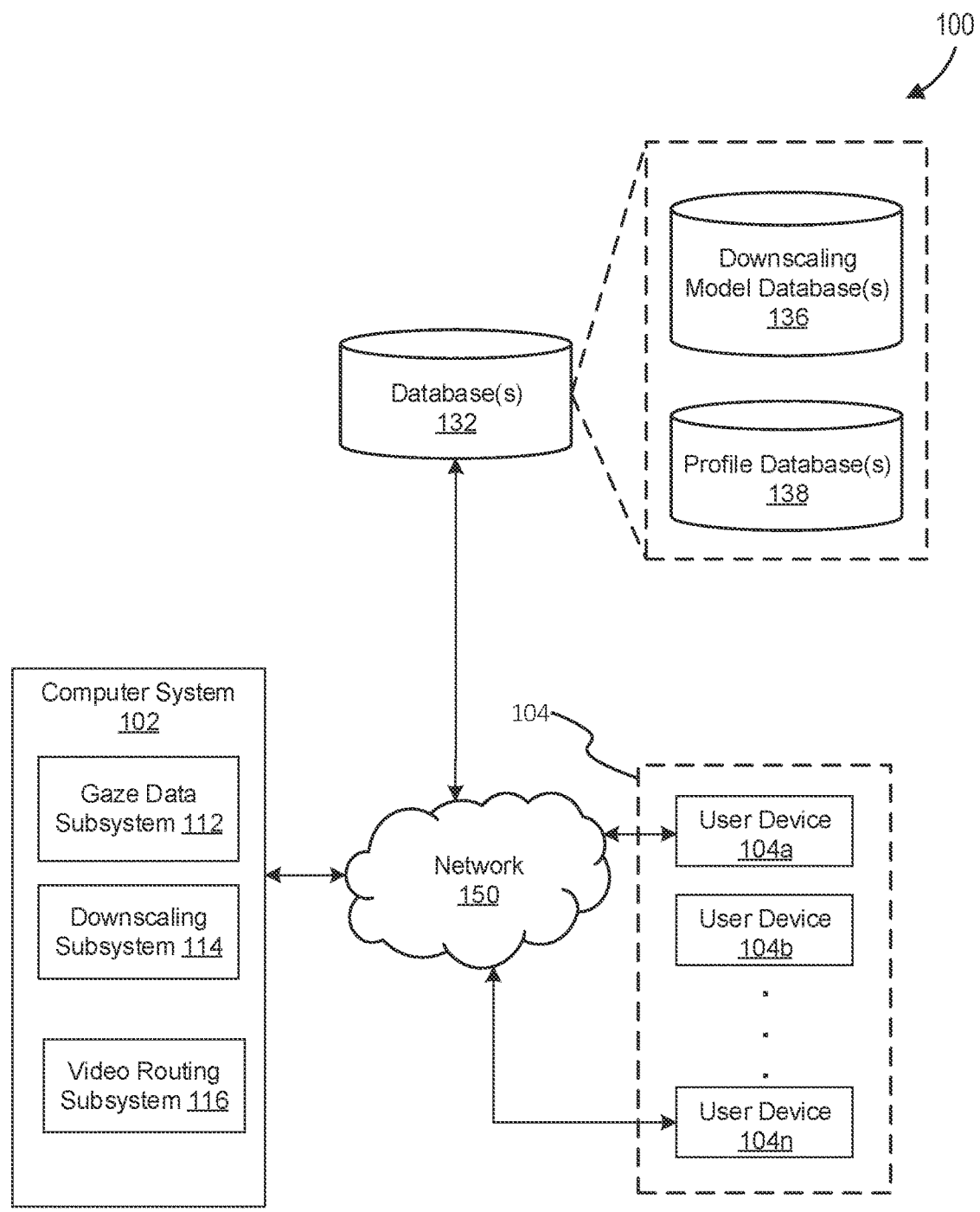
FIG. 1 shows a system for updating video images for video communication, in accordance with one or more embodiments.

FIG. 1 show a system for updating video images for video communication, in accordance with one or more embodiments. As shown in FIG. 1, system 100 may include a computer system 102, user devices 104 (such as user devices 104a-104n), or other components. The computer system 102 may include a gaze data subsystem 112, downscaling subsystem 114, video routing subsystem 116, and/or other components. Each device of the user devices 104 may include any type of mobile computing device, fixed computing device, or another type of computing device. By way of example, the user devices 104 may include any combination of desktop computers, notebook computers, tablet computers, smartphones, virtual reality headsets, augmented reality headsets, other types of wearable devices, or other user devices. Users may, for instance, utilize one or more user devices 104 to interact with one another, one or more servers, or other components of system 100.

It should be noted that, while one or more operations are described herein as being performed by particular components of computer system 102, those operations may, in some embodiments, be performed by other components of computer system 102 or other components of system 100. As an example, while one or more operations are described herein as being performed by components of computer system 102, those operations may, in some embodiments, be performed by components of one or more devices of the user devices 104. It should be noted that, although some embodiments are described herein with respect to machine learning models, other prediction models (e.g., statistical models or other analytics models) may be used in lieu of or in addition to machine learning models in other embodiments (e.g., a statistical model replacing a machine learning model and a non-statistical model replacing a non-machine-learning model in one or more embodiments).

In some embodiments, the system 100 obtains gaze data from each respective device of the user devices 104, the gaze data indicating a respective screen location in pixel space or a normalization of pixel space. For example, the user device 104a may collect gaze data indicating a first normalized coordinate (0.5, 0.5) indicating a gaze location of a first user on a screen of the user device 104a. Concurrently, the user device 104b may collect gaze data indicating a second normalized coordinate (0.6, 0.6), indicating the location of a second user's gaze on a screen of the user device 104b. The user devices 104 may then concurrently send the first normalized coordinate and second normalized coordinate to a device connected to the network 150, such as the computer system 102, other devices of the user devices 104, each other, or other computing systems. The gaze data may be provided in various formats and include data associated with gaze, such as categories associated with a gaze location, timepoint of the gaze location measurement, gaze duration, or the like.

In some embodiments, the gaze data subsystem or the downscaling subsystem may include one or more neural networks or other machine learning models. As an example, neural networks may be based on a large collection of neural units (or artificial neurons). Neural networks may loosely mimic how a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function that combines the values of all its inputs together. In some embodiments, each connection (or the neural unit itself) may have an activation function such that the signal must surpass a threshold of the activation function before it propagates to other neural units. These neural network systems may be self-learning and trained, rather than explicitly programmed, and can perform significantly better in certain areas of problem-solving, as compared to traditional computer programs. In some embodiments, neural networks may include multiple layers (e.g., where a signal path traverses from front layers to back layers). In some embodiments, back propagation techniques may be utilized by the neural networks, where forward stimulation is used to reset weights on the "front" neural units. In some embodiments, stimulation and inhibition for neural networks may be more free-flowing, with connections interacting in a more chaotic and complex fashion. For example, some embodiments may use neural network models having skip connections to connect one layer of a neural network to receive inputs from multiple other layers of the neural network, as described elsewhere in this disclosure.

Figure 2:
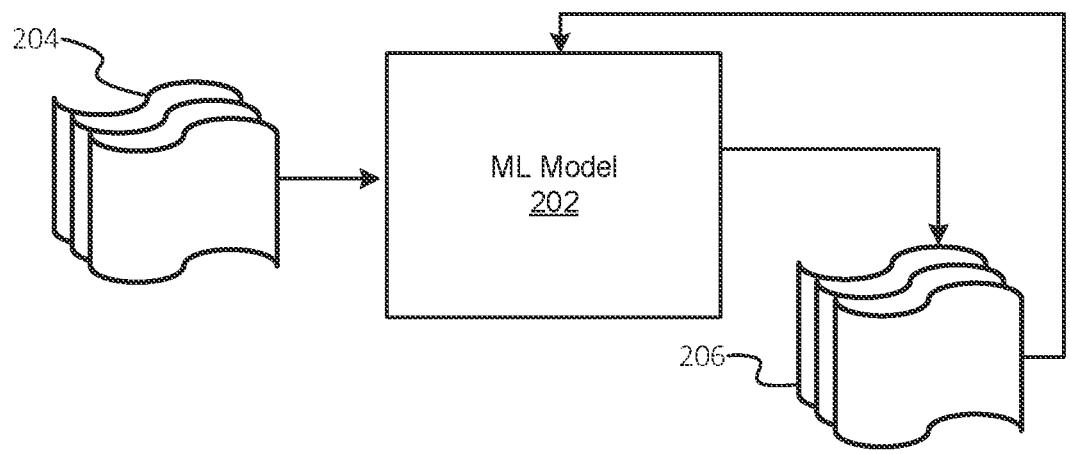
FIG. 2 shows a machine learning model configured to downscale images based on gaze data during multi-party communication, in accordance with one or more embodiments.

FIG. 2 shows a machine learning model configured to downscale images based on gaze data during multi-party communication, in accordance with one or more embodiments. As an example, with respect to FIG. 2, a machine learning model 202 may take inputs 204 and provide outputs 206. In one use case, outputs 206 may be fed back to the machine learning model 202 as input to train the machine learning model 202 (e.g., alone or in conjunction with user indications of the accuracy of the outputs 206, labels associated with the inputs, or with other reference feedback information). In another use case, machine learning model 202 may update its configurations (e.g., weights, biases, or other parameters) based on its assessment of its prediction (e.g., outputs 206) and reference feedback information (e.g., user indication of accuracy, reference labels, or other information). In another use case, where machine learning model 202 is a neural network, connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 202 may be trained to generate better predictions.

In some embodiments, the machine learning model 202 may include a convolutional neural network (CNN). The CNN may include operations to apply a convolution filter, such as a convolution filter based on a 3×3 kernel, and generate a convolved output based on applying the convolution filter across an image at a stride interval. The convolved output of the CNN may be used as a feature map input for the neural network layers of the CNN to determine a final output of the CNN. A CNN may be used to perform one or more operations described in this disclosure, such as determining regions to downscale, reconstructing a downscaled image, or the like. Some embodiments may use depth-wise separable convolutions for a CNN. For example, some embodiments may implement a depth-wise-separable convolution by first splitting an input stream into multiple channels based on color. Furthermore, some embodiments may include more than 10 or more than 20 different convolutional layers of varying size, where some embodiments may further include max pooling layers in the CNN model architecture.

Some embodiments may use a neural network model having skip connections, where a neural network model employing skip connections may include one or more neural network layers that provide direct outputs to multiple other layers of the neural network. For example, some embodiments may determine a first output of a first layer of a CNN and provide the first output as an input to the next layer of the neural network. However, the same first output may also be provided as an input to another layer of the CNN to determine a third output, where the second and third outputs may be received at the same or at separate layers of the CNN. For example, some embodiments may receive both the second and third outputs as inputs of a fourth layer. Alternatively, some embodiments may receive the second output as an input of the fourth layer and receive the third output as an input of the fifth layer. Outputs of the CNN using skip connections may include a set of spatial indicators that indicate which pixels of an image to retain or discard during image downscaling. Alternatively, or in addition, in some embodiments, an output of a CNN may include a reconstruction of a downscaled image or be otherwise used to determine the reconstruction.

Subsystems 112, 114, and 116

In some embodiments, the gaze data subsystem 112 may obtain gaze data from some or all of the user devices 104, where the gaze data may include some measurement of the gaze of one or more users. For example, the gaze data subsystem 112 may collect a gaze location and a gaze duration at the gaze location every 50 milliseconds from each of the user devices 104. Some embodiments may categorize obtained gaze data into fixations or saccades. For example, some embodiments may categorize a focal location as a fixation based on the gaze location not deviating from a pre-determined radius of its current location for at least a gaze fixation threshold. Alternatively, or in addition, some embodiments may categorize a gaze location as a saccade, where a gaze location categorized as a saccade may indicate that the gaze location is one in a sequence of quick, rapid eye movements when an eye is reviewing features of an image. Additionally, some embodiments may determine one or more gaze scan paths of a user using a computing device, where a gaze scan path may include a sequence of gaze locations over a period of time or the trajectory formed by the sequence of gaze locations. Some embodiments may use a set of gaze scan paths to anticipate future gaze locations and determine downscaled encodings of video based on the anticipated future gaze locations, as described elsewhere in this disclosure. Some embodiments store gaze data associated with a user device or a user of the user device in a database(s) 132, which may include a profile database 138. For example, some embodiments may store gaze locations, measurement times of the gaze locations, and gaze trajectories associated with a specific user in the profile database 138.

In some embodiments, the downscaling subsystem 114 may generate a set of video encodings based on a video source. For example, the downscaling subsystem 114 may downscale images provided by the user device to generate a set of downscaled encodings of the images. As further described in this disclosure, various methods may be used to downscale an image. As further described in this disclosure, some embodiments may apply a two-dimensional anti-aliasing filter on a region of an image and then downscale the region using one or more various types of image scaling algorithms. For example, some embodiments may use a nearest-neighbor interpolation algorithm, where every pixel of a set of pixels in the region may be replaced with the nearest pixel. Some embodiments may instead use an interpolation method to downscale the region of the image, where an interpolation method may include a bilinear interpolation algorithm, Lanczos algorithm, another cubic interpolation algorithm, or the like. Some embodiments may interpolate an image's pixel color values and reconstruct the image based on those interpolated values. Some embodiments may use a Fourier-transform algorithm to generate a downscaled image or an edge-directed interpolation method. As further described below, some embodiments may use a neural network, such as a CNN, to generate a downscaled image. In some embodiments, the downscaled image may be upscaled or otherwise reconstructed using a neural network, such as second CNN trained to reconstruct an image using a generative adversarial training operation.

In some embodiments, the downscaling subsystem 114 may use model parameters stored in the database(s) 132, which may include a downscaling model database(s) 136. As described elsewhere in this disclosure, some embodiments may perform multiple types of downscaling, either concurrently or in sequence. For example, some embodiments may use a first type of downscaling model stored in the downscaling model database(s) 136 to generate a first encoding of a video stream using a first set of downscaling model parameters. In response to one or more criteria being satisfied, some embodiments may then use the same type of downscaling model stored in the downscaling model database(s) 136, but use a second set of downscaling model parameters that is also retrieved from the downscaling model database(s) 136 to generate a second encoding of the video stream. In some embodiments, the second set of downscaling model parameters may differ from the first set of downscaling model parameters with respect to a number of iterations, a kernel size, an anti-aliasing value, or the like. Alternatively, or in addition, some embodiments may use a second type of downscaling model stored in the downscaling model database(s) 136 in response to one or more criteria being satisfied. For example, as further described below, some embodiments may switch from using an interpolation method having parameters stored in the downscaling model database(s) 136 to a neural-network-based downscaling method stored in the downscaling model database(s) 136.

In some embodiments, the video routing subsystem 116 may determine which video encoding to send to one or more of the user devices 104. For example, the video routing subsystem 116 may send a first video encoding to the user device 104a and send a second video encoding to the user device 104b. The first video encoding and second video encoding may be different from each other but generated from video images provided by the same video source, such as the user device 104n. The encodings may differ with respect to the amount of data used to store an image downscaled from a shared source image, image resolution, color values, or the like. Alternatively, the video routing subsystem 116 may transmit the same video encoding to multiple user devices. For example, the video routing subsystem 116 may transmit a first video encoding generated from a video stream provided by the user device 104a to both the user device 104b and the user device 104n.

Figure 3:
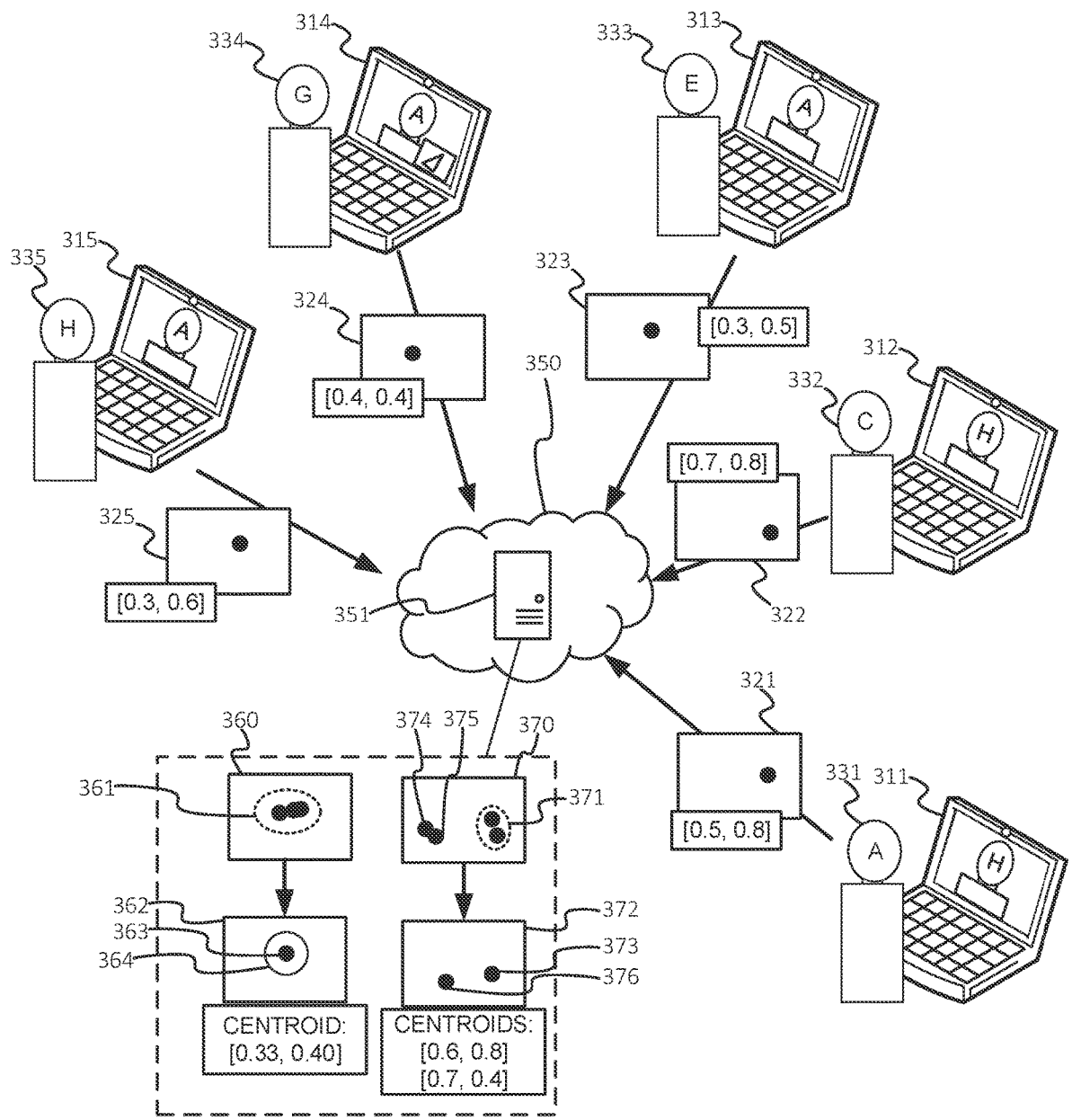
FIG. 3 shows an example network of computing devices to update images being sent over a network based on gaze data, in accordance with one or more embodiments.

FIG. 3 shows an example network of computing devices to update images being sent over a network based on gaze data, in accordance with one or more embodiments. 3 shows an example network of computing devices to update images being sent over a network based on gaze data, in accordance with one or more embodiments. In some embodiments, a computing device 311 may act as a video source that sends video data to the computing devices 313-315 via a network 350. The network 350 may provide access to a cloud server 351, which receives video data from the computing device 311 and may perform one or more operations described in this disclosure. The network 350 may receive gaze data from each of the computing devices 311-315 indicate a gaze location of a corresponding user of the users 331-335, where the gaze location may be represented by one of the boxes 321-325. For example, the computing device 311 may determine a gaze location of the user 331, where the gaze location may be represented by the normalized vector [0.5, 0.8], as illustrated by the box 321. Similarly, the computing device 312 may determine a gaze location of the user 332, where the gaze location may be represented by the normalized vector [0.5, 0.8], as illustrated by the box 322. Similarly, each respective computing device of the computing devices 313-315 may determine a respective gaze location of the respective user amongst the users 333-335, where the gaze location may be represented by the normalized vectors [0.3, 0.5], [0.3, 04], and [0.3, 0.6] as illustrated by the box 322. Additionally, some embodiments may obtain measurement times of the gaze locations or sequences of gaze locations representing gaze scan paths from each of the computing devices 311-315.

In some embodiments, the cloud server 351 may receive gaze data, including gaze locations represented by the boxes 321-325. The cloud server 351 may determine a collection of gaze locations using one or more operations described above. Some embodiments may apply a clustering operation to determine clusters of gaze locations shared between computing devices receiving data from the same video source. For example, the cloud server 351 may determine that each of the computing devices 313-315 receive video data from the computing device 311. The cloud server 351 may then determine a cluster of gaze locations 361 in rectangle 360 using a clustering algorithm such as a density-based spatial clustering of applications with noise (DB-SCAN) algorithm, where the cluster may include the gaze locations vectors [0.3, 0.5], [0.3, 04], and [0.3, 0.6]. Some embodiments may then determine that a centroid of this cluster has normalized pixel space coordinates represented by the vector [0.33, 0.5] and use the centroid as aspatial indicator when determining a downscaled encoding of an image. Additionally, the cloud server 351 may determine that each of the computing devices 311-312 receive video data from the computing device 315. Using one or more operations described in this disclosure, some embodiments may determine that a centroid of a collection of gaze locations provided by the computing devices 311-312 (shown in rectangle 370 as a cluster of gaze locations 371) is at the normalized position vector [0.6, 0.8], as represented by the point 373 in the rectangle 372. Additionally, some embodiments may obtain gaze scan paths of the computing devices 311-312 to determine a set of predicted future gaze locations represented by points 374 and 735 in rectangle 370. Some embodiments may then cluster the predicted future gaze locations to determine an additional spatial indicator represented by the point 376, such as by determining a centroid of the points 374 and 375.

Some embodiments may generate a set of masks based on these centroids, where a mask may be used to generate or otherwise update a video encoding by downscaling an encoding of the video data being provided by the computing device 311, the computing device 315, or another computing device using one or more operations described in this disclosure. For example, some embodiments may generate a mask represented by the rectangle 362, where the position of the point 363 relative to the corners of the rectangle 362 may represents a first spatial indicator of the mask indicating the centroid [0.33, 0.5]. Some embodiments may then select a first region of a mask represented by the circle 364 as a spatial indicator, where the region outside of this spatial indicator in pixel is downscaled using one or more operations described in this disclosure. Alternatively, or in addition, some embodiments may use a neural network to downscale a portion of the video data provided by a camera of the computing device 311. Similarly, some embodiments may generate a mask represented by the rectangle 372, where the position of the point 373 and the point 376 relative to the corners of the rectangle 372 may represents a first and second spatial indicator of the mask indicating the centroid positions [0.6, 0.8] and centroid positions [0.7, 0.4].

In some embodiments, the cloud server 351 may send a mask or other set of spatial indicators to a computing device. For example, the cloud server 351 may send the mask represented by the rectangle 362 or data associated with the mask (e.g., a set of spatial indicators of the mask represented by the rectangle 362) to the computing device 311. The computing device 311 may then use the mask or data associated with the mask to encode the video data being uploaded by the first system, which may reduce the total amount of data being uploaded by the computing device 311 during a concurrent video communication session. Alternatively, or in addition, each of the computing devices 313-315 may send gaze data directly to the computing device 311, where the computing device 311 may then determine a set of spatial indicators used for downscaling. In some embodiments, the computing device 311 may then determine a set of downscaled encodings based on the set of spatial indicators. For example, the computing device 311 may generate a downscaled video encoding, where the highest density of pixels of the downscaled video encoding is centered around a spatial indicator representing a centroid of gaze locations provided by the first set of computing devices 313-315. Similarly, the computing device 315 may generate and upload a downscaled video encoding based a mask represented by the rectangle 372. By reducing the amount of data to upload by a video source device such as the computing device 311, some embodiments may increase the reliability or efficiency of video communication sessions between devices having low upload data rates or low download data rates.

As discussed elsewhere in this disclosure, some embodiments may receive updated gaze locations during a video communication session, where an update to the gaze location may cause the detected centroid to change locations. For example, if the user 335 looks away from the screen or is otherwise detected to have a gaze location that exceeds a boundary of an application presenting video data, some embodiments may update a cluster to remove the gaze location from that cluster. Alternatively, or in addition, some embodiments may stop the corresponding computing device from receiving video data. For example, if the computing device 313 detects that the user 333 has a gaze location outside the boundary of an application or a sub-window of the application displaying a set of video images of a first video stream, some embodiments may stop the transmission of images of the first video stream to the computing device 313.

Example Flowchart

Figure 4:
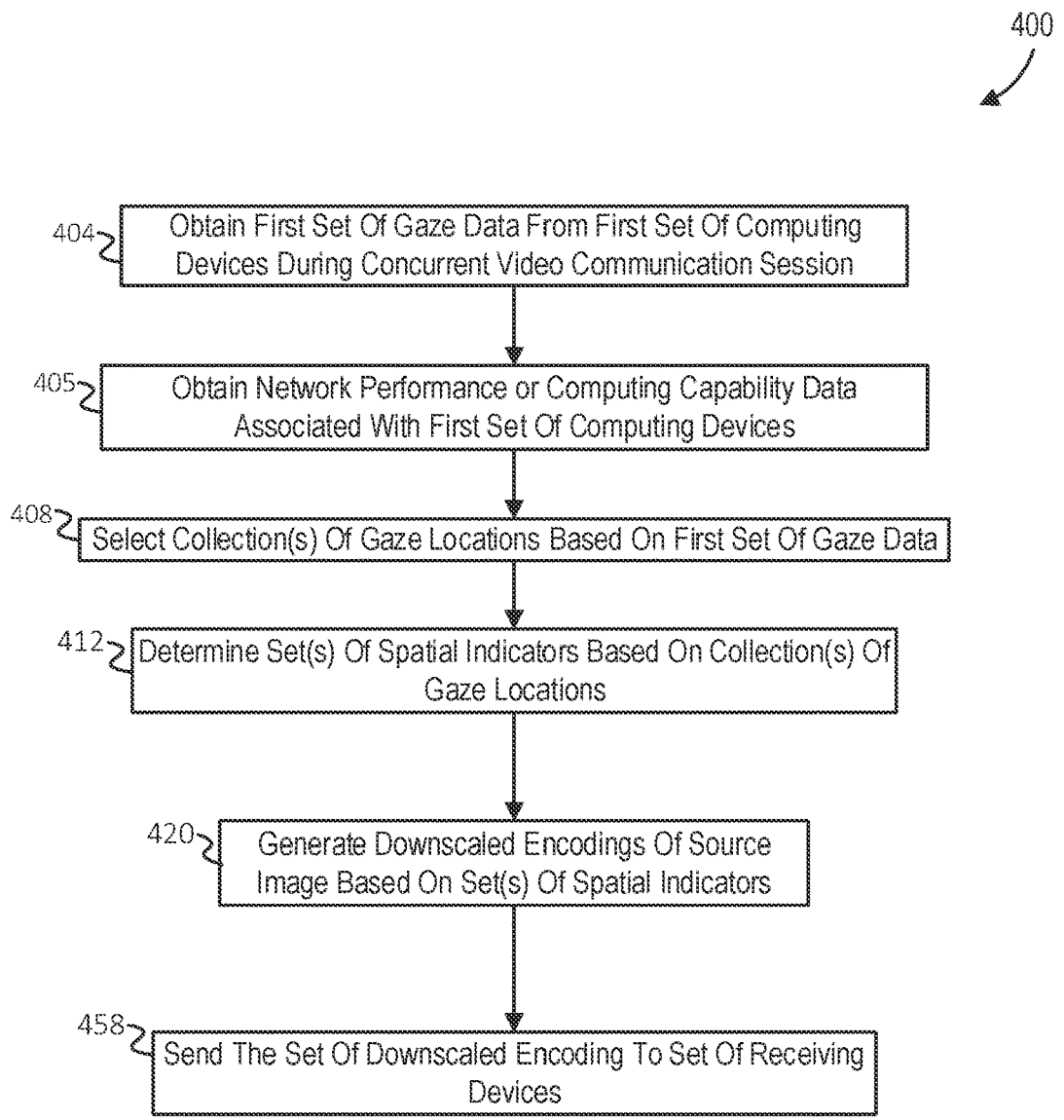
FIG. 4 shows a flowchart of operations to downscale images based on gaze data, in accordance with one or more embodiments.

FIG. 4 is an example flowchart of processing operations of methods that enable the various features and functionality of the system as described in detail above. The processing operations of each method presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

In some embodiments, the methods may be implemented in a system that includes one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

FIG. 4 shows a flowchart of operations to downscale images based on gaze data, in accordance with one or more embodiments. Operations of the method 400 may begin at block 404. In some embodiments, operations of the method 400 may include obtaining a first set of gaze data from a first set of computing devices during a concurrent video communication session, as indicated by block 404. In some embodiments, the concurrent video communication sessions between multiple computer devices may occur via a remote server or cloud service, where video or sound communication is routed to the server or service before being sent to one or more destinations. Alternatively, or in addition, the computing device recording the video or sound data for the communication may perform one or more operations described in this disclosure to generate downscaled video encodings and provide the downscaled encodings to the first set of computing devices. For example, a video-source computing device and onlooker computing devices receiving the video-source computing device may be participating in a networked distributed computing platform. Alternatively, or in addition, some embodiments may perform other operations described in this disclosure, such as operations indicated by blocks 405, 412, 420, or 458, without requiring the use of a remote server or service to perform computing operations. For example, some embodiments may determine a set of spatial indicators or generate downscaled encodings of a source image using a processor of a user computing device that is concurrently recording and providing video data to other user computing devices during concurrent video communication sessions.

In some embodiments, the concurrent video communication sessions may occur in the form of a video conference being held between multiple participants, where each participant may receive video data, such as sequences of images, from one or more other participants. For example, some embodiments may perform one or more operations described in this disclosure during concurrent video communication between more than two, more than five, more than 10, or more than 50 computing devices, where multiple groups of computing devices may send or receive videos or other image data to other groups of computing devices. In some embodiments, some or all of the computing devices participating in the concurrent video communication sessions may receive video data from some or all of the other computing devices. Alternatively, or in addition, some of the computing devices participating in the concurrent video communication sessions may operate to only receive video data or to only provide video data when participating in the concurrent video communication session.

The first set of gaze data may include gaze locations, where a gaze location may include or otherwise be associated with a position on an object that an eye is focused on. Some embodiments may obtain a gaze location via a computing device and determined based on data collected from one or more sensors of the computing device using one or more methods described in Kar et al. (Kar, A. and Corcoran, P., 2017. A review and analysis of eye-gaze estimation systems, algorithms and performance evaluation methods in consumer platforms. IEEE Access, 5, pp. 16495-16519), which is hereby incorporated by reference. For example, some embodiments may determine a gaze location by determining a head orientation and a measurement of a fovea reflection or other retinal reflection.

Some embodiments may collect gaze data based on gaze fixation, which may include data indicating a position upon which an eye is focused, a total fixation duration, a mean fixation duration or some other measure of central tendency of fixation, a fixation spatial density, a number of areas fixated, a sequence of different fixation positions, a rate fixation change, or the like. Some embodiments may also collect data based on saccade measurements, where the saccade measurements may indicate rapid eye movements that occur between fixations. For example, some embodiments may measure a saccade number, a saccade amplitude, or a fixation-saccade ratio.

Some embodiments may further determine a gaze scan path, which may include or otherwise be associated with a series of gaze locations as they are tracked from an initial location on a visual display to a new location on the visual display. For example, some embodiments may determine a scan path direction, a scan path duration, a scan path length, or an area covered by a scan path. Some embodiments may then use the gaze scan path to determine future predicted gaze locations. For example, some embodiments may predict new gaze scan path locations based on an existing scan path using a gaze scan path prediction model, such as a prediction model using a deep neural network as described by Xu et al. (Xu, Y., Dong, Y., Wu, J., Sun, Z., Shi, Z., Yu, J. and Gao, S., 2018. Gaze prediction in dynamic 360 immersive videos. In proceedings of the IEEE Conference on Computer Vision and Pattern Recognition (pp. 5333-5342)), which is incorporated herein by reference. Some embodiments may store gaze scan paths or associated data, such as a sequence of gaze locations, their corresponding measurement times, or other values in a user or device profile, which may then be used to train a gaze scan path prediction model to increase the accuracy of predictions of future gaze locations.

Some embodiments may apply one or more filters to pre-filter gaze data. In some embodiments, the filter may be based on a duration. For example, some embodiments may obtain a gaze location that is associated with a gaze location, where the gaze duration indicate the amount of time that a gaze is measured to be centered around a gaze location. In some embodiments, to reduce noise, some embodiments may determine whether the gaze duration satisfies a gaze duration threshold. In response to a determination that the gaze duration satisfies the gaze duration threshold (e.g., by being greater than the gaze duration threshold), some embodiments may increase the gaze duration.

Some embodiments may perform video-based gaze tracking using a digital camera, infrared camera, near-infrared camera, or the like. For example, an LED array may be used to send infrared light into an eye and the light reflected off of the cornea of the eye may be used to determine a gaze position on a computer screen, headset display, or other visual display. Some embodiments may use a single camera to collect gaze data. Alternatively, or in addition, some embodiments may use multiple cameras to collect gaze data. Some embodiments may include an option to calibrate or recalibrate a gaze tracking system. For example, some embodiments may detect that a gaze position from a computing device is fixed on a position that is outside of a video window during a presentation or other concurrent video communication session. In response, some embodiments may send a message to the computing device providing this video, where the computing device may perform one or more re-calibration operations based on the message.

Some embodiments may perform operations to determine a gaze location based on a combination of the gaze direction of an eye and a head position. For example, some embodiments may determine a gaze position based on the equation dk−dkref=k(dkgaze−dkref), where dkgaze may be the eye gaze direction, dk may be a head position, dkgaze may be a reference gaze direction, and k may be a constant related to a head tilt or pan value. Some embodiments may perform one or more regression-based methods, such as a two-dimensional regression method by determining the vector between a pupil center and a corneal glint (pupil-glint vector) using a polynomial transformation function. Alternatively, or in addition, some embodiments may use a calibration-free method such as performing gaze estimation using a machine learning method such as a neural network trained to identify a gaze location position based on a gaze direction and a head position. For example, some embodiments may use a multilayer neural network to determine a mapping function between gaze coordinates and the pupil-glint vector determined from a reflection of light off of a retina. In some embodiments, the parameters of the neural network maybe stored in a profile repository, where a system may reference the profile repository to determine a set of user-specific parameters of the neural network used to determine a gaze location for the corresponding user of the set of user-specific parameters.

Some embodiments may determine gaze data based on appearance-based methods, where an appearance-based method may be used to determine a gaze location using images of the human eye. Some embodiments may use a statistical model to determine a gaze position based on images of an eye region that has been annotated with landmark points and converted into a shape vector. For example, some embodiments may use principal component analysis (PCA) on a vector that includes a set of aligned shapes. Some embodiments may use a machine learning model such as a trained neural network or a trained SVM to determine gaze location or related gaze data based on one or more appearances captured by a camera.

Some embodiments may include or distribute applications that include routines to determine gaze position from a computing device. For example, some embodiments may distribute JavaScript code or web assembly code to computer browsers operating on user computing devices, where the JavaScript or web assembly code may be used to determine a gaze position using one or more of the methods described in this disclosure. Some embodiments may use an application program interface (API) of a native operating system to collect a gaze position using a gaze tracking device. For example, some embodiments may use a method of the "GazePointPreview" class of the gaze interaction library of Microsoft Windows to determine properties for a gaze input point associated with a gaze tracking device.

Some embodiments may obtain gaze data, such as gaze locations, in the form of relative values, where a relative value may be normalized by a boundary of an application. For example, some embodiments may transmit a gaze location in the form of a vector of ratios that have been normalized to range from 0.000 to 1.000, where the ratio indicates a cardinal coordinate (e.g., a horizontal or vertical direction). For example, if a gaze location is determined to have been at the pixel-based measurement (200, 200) for an application having a pixel boundary window ranging from (0,0) on a computer screen to (800, 800) on the computer screen, some embodiments may determine that the gaze location is at (0.25, 0.25). By providing relative locations of gaze location, some embodiments may accommodate users who may have screens with different dimensions, set their screens at different window sizes, or otherwise reconfigure the arrangement of a video-displaying application on a screen. Some embodiments may also provide the location of one or more sub-windows in an application, where the sub-windows may be used to display video or other image data from different sources. For example, some embodiments may provide the coordinates (0.1, 0.1, 0.2, 0.2) in association with the title "videosource1" to indicate that a video stream provided by a source labeled "videosource1" is being shown in the normalized coordinate of the application in a rectangular box having an upper left-hand corner at (0.1, 0.1) and a lower right-hand corner at (0.2, 0.2). By obtaining values indicating one or more sub-windows, some embodiments may account for different configurations between visualizations on the screens of devices participating in a multi-party video communication session.

Some embodiments may store the set of gaze locations or associated gaze data at a centralized repository or set of centralized repositories. For example, some embodiments may receive the set of gaze locations or associated data at an on-site server. Alternatively, or in addition, some embodiments may store the set of gaze location data on a memory of a cloud computing service. For example, after obtaining a set of gaze data, some embodiments may store and process the gaze data using a cloud server such as a Microsoft Azure server, Google cloud server, Amazon AWS server, or the like. Alternatively, or in addition, one or more operations of the concurrent video communication sessions may occur via a network that is distributed amongst the computing devices themselves. For example, some embodiments may send a set of gaze locations collected from a first user computing device of a set of networked devices operating as a decentralized computing platform to a second user computing device of the set of network computing devices.

In some embodiments, operations of the method 400 may include obtaining network performance data or computing capability data associated with the first set of computing devices, as indicated by block 405. Network performance data may include bounds of performance for the bandwidth of a computing device of the first set of computing devices, such as an upper bound or lower bound of the computing device's data transfer rates. Network performance data may also include other network performance metrics, such as network latency, an actual data transfer rate for uploads, a rate of data transfer for downloads, or the like. For example, some embodiments may obtain the download data rates for each computing device of the first set of computing devices. As further described in this disclosure, some embodiments may use the measurements of one or more network performance metrics to determine a downscaling parameter. For example, some embodiments may downscale an image using a Lanczos resampling algorithm, where a parameter of the Lanczos resampling may include a count of iterations to use when downscaling system-determined regions of an image. In some embodiments, the parameter may be equal to the number two if the network performance is greater than a download threshold and may be equal to the number three if the network performance is less than or equal to the download threshold. Additionally, in some embodiments, the upload rate or download rate may be used to determine a dimension (e.g., length, width, area, volume, or the like) of a region used for a mask, such as a region represented by a contiguous block of same-valued elements in a matrix of a binary mask. Alternatively, or in addition, the data-ratedetermined dimension may be used to determine a downscaling parameter, such as a number of iterations of downscaling, a number of pixels to include in a downscaled image, a density of pixels to include in the downscaled image, or the like.

In some embodiments, the network performance data may include an upload rate of a video source. For example, some embodiments may use a downscaling method capable of generating a first encoding of a video or a second encoding of a video, where the first encoding of the video requires less memory than the second encoding. Some embodiments may determine whether an upload data rate of a first computing device satisfies an upload threshold, where the first computing device is uploading video for consumption by a plurality of other computing devices during a video communication session. In response to a determination that the upload data rate satisfies the upload threshold, some embodiments may modify a downscaling parameter such that the downscaled encoding is the first encoding of the video. In some embodiments, a determination may be made that the upload data rate does not satisfy the upload threshold. In response, some embodiments may modify a downscaling parameter such that the downscaled encoding is the second encoding of the video, where the second encoding may use less data than the first encoding.

Alternatively, or in addition, some embodiments may determine a required data rate, such as a total data rate needed to stream video data from a computing device during a video communication session. Some embodiments may determine whether the required data rate satisfies a data amount threshold based on the upper bound of the upload data rate. For example, some embodiments may determine a required data rate for a computing device that is uploading two different encodings of a video stream. Some embodiments may determine whether a data amount threshold is satisfied based on whether the required data rate for concurrently uploading the two encodings is less than the upper bound. Some embodiments may have a criterion that the required data rate satisfies the data amount threshold, and may cause a new version of an encoding to be generated in response to a determination that the required data rate does not satisfy the data amount threshold, where the new version of the encoding may require data than a previous version of the encoding.

Computing capability data may include hardware performance metrics of one or more computing devices. For example, some embodiments may obtain processor speeds or available RAM for each computing device of the first set of computing devices. In some embodiments, indicators of features available via of software may include an indicator of whether a performance value is acceptable for one or more downscaling and upscaling methods. For example, as further described in this disclosure, some embodiments may be capable of downscaling an image in different ways and may choose which downscaling algorithm to use based on one or more features or capabilities of an image-receiving computing device.

In some embodiments, operations of the method 400 may include selecting one or more collections of gaze locations based on the first set of gaze locations, as indicate by block 408. The collection of gaze locations may be selected based on a similarity of coordinates with respect to each other and may be represented as a collection of positions stored in normalized coordinates, pixel-space coordinates, or another coordinate system. Some embodiments may determine a collection of gaze locations by performing a clustering operation based on a clustering model, such as a centroid model, a connectivity model, a distribution model, or a density model. For example, some embodiments may generate a cluster of gaze locations by implementing an algorithm based on a density model, such as a DBSCAN algorithm or a ordering points to identify the clustering structure (OPTICS) algorithm. Some embodiments may use parameters of a video communication session to determine one or more parameters of a clustering operation. For example, some embodiments may determine a maximum distance parameter of a DBSCAN operation based on a height or width of an application or an application sub-window. For example, some embodiments may use 0.1 as the maximum distance of consideration for clustering if a sub-window displaying a video stream has a normalized size of 0.1. Alternatively, or in addition, some embodiments may determine a minimum number of points required to form a cluster based on a count of participants obtaining video data from a video stream source. For example, some embodiments may require a minimum number of points for a cluster based on a ratio of the total number of participants viewing a video stream.

In some embodiments, operations of the method 400 may include determining one or more sets of spatial indicators based on the one or more collections of gaze locations, as indicated by block 412. Some embodiments may use the set of spatial indicators to downscale images to decrease bandwidth use, as further described in this disclosure. In some embodiments, a set of spatial indicators or a subset of spatial indicators may be included in a mask for use during downscaling. For example, a mask may include a binary mask that indicates which pixels or other spatial regions of an image to allocate as a first region or a second region, where the first region is to be downscaled, where the second region is not to be downscaled. In some embodiments, a mask may include a multi-dimensional matrix where each entry in the matrix may represent a value to indicate a downscaling treatment. For example, some embodiments may generate a set of spatial indicators in the form of a mask having a matrix that has the same dimensions as an image to be downscaled. Each element of the matrix may indicate how the pixel at the corresponding two-dimensional position should be treated during a downscaling operation. The matrix may include entries selected from a categorical set of values such as "[0, 3, 5]," where the matrix position of the entry may represent a coordinate in pixel space, and where the categories may indicate which regions of an image to not downscale, downscale to a first pre-set resolution, or downscale to a second pre-set resolution, respectively. For example, regions labeled as "3" may be downscaled using a 3×3 matrix and regions labeled as "5" may be downscaled using a 5×5 matrix. Furthermore, as discussed elsewhere in this disclosure, some embodiments may set the size or other dimension of a region of the matrix based on a download data rate or an upload data rate. For example, a greater download data rate or upload data rate may be correlated with a greater dimension of an image region that will not be downscaled.

Some embodiments may associate multiple computing devices with one set of spatial indicators, where each device of the multiple computing devices receive video data from a shared video source. For example, some embodiments may associate five different computing devices with a first set of spatial indicators, where the first set of spatial indicators will be used to generate a downscaled encoding that will be sent to each of the five different computing devices. Alternatively, or in addition, some embodiments may generate a different set of spatial indicators associated with a video for each computing device that receives the video. For example, a first, second, and third video-receiving computing device may receive video data from a shared video source. Some embodiments may generate three different masks for each of the three different video-receiving computing devices and associate each mask with its corresponding computing device.

As described above, some embodiments may use a clustering algorithm or other aggregation algorithm to determine collections of gaze locations or associated data, where the gaze locations may be associated with multiple gaze locations for each computing device assigned to receive video data from a shared video source. For example, some embodiments may have used a DB SCAN clustering algorithm to determine clusters of gaze locations based on the previous 50 gaze locations of each computing device of a set of ten computing devices, resulting in a total of 500 gaze locations. After clustering, some embodiments may generate an initial 25 clusters of gaze locations using the DBSCAN clustering algorithm based on a pre-determined set of DBSCAN clustering parameters stored in a model database. Some embodiments may then generate a corresponding number of 25 spatial indicators, the spatial indicators in the form of interpolated boundaries representing regions in the image space of an application screen. A system may then rank each region of the initial plurality of regions by a respective count of positions encompassed by the respective region, where the positions may represent gaze locations. Some embodiments may select the regions based on the ranking and a termination criterion, such as a maximum number of regions, maximum cumulative region area, or the like. For example, some embodiments may select a maximum of three regions from the 25 regions based on which regions encompass the greatest number of positions.

Some embodiments may determine that a region of a screen includes a section of text or other priority information. For example, some embodiments may perform optical character recognition (OCR) on an image to detect one or more lines of text. In response to detecting a section of text or other targeted high-detail information, some embodiments may generate or update a set of spatial indicators to include a region encompassing the line of text. Some embodiments may also include or send a user interface (UI) having UI elements to a video stream source, where an interaction with the UI elements may indicate a region of a presented video to not downscale or otherwise indicate as including prioritized content. Alternatively, or in addition, some embodiments may use a neural network to detect features of an image and classify one or more of the features as priority information. For example, some embodiments may detect a set of facial features and assign, as a set of spatial indicators in normalized or unnormalized pixel space, a point on the facial features or region covering the facial features. As further discussed, the spatial indicators may be used to determine which regions of an image to keep upscaled and which regions of the image to downscale.

Some embodiments may use a neural network to detect a feature of a non-facial element, such as text, bright contrast points, or portions of an object in an image or sequence of images (e.g., videos) and generate or otherwise update a spatial indicator to correspond with the position of this feature. For example, some embodiments may use a neural network to detect features of a web presentation or category of web presentation, such as a set of figures and text of the presentation. After detecting the features, some embodiments may generate a set of spatial indicators corresponding to the locations of the figures and text in pixel space and use the spatial indicators to indicate regions to not downscale during an image downscaling operation. In some embodiments, neural network parameters, such as weights, biases, activation function constants, or the like, may be determined when training the neural network and may be stored in one or more records of a model database. For example, some embodiments may determine that a slide presentation is being displayed or receive an indication via a user interface element that the slide presentation is being displayed. In response, some embodiments may retrieve a set of neural network parameters trained to identify features associated with the presentation, such as a specific geometrical shape or graph feature. Some embodiments may further include different sets of parameters for different categories of presentations. For example, some embodiments may retrieve a first set of parameters for a neural network based on the presentation being categorized as a "lecture" and retrieve a second set of parameters for the neural network based on the presentation being categorized as a "entertainment show."

In some embodiments, a gaze duration may be used to determine a weighting value when determining the spatial indicator. For example, some embodiments may use a linear or logarithmic function based on a gaze duration to determine a coefficient. In some embodiments, an increase in the gaze duration may increase the coefficient, and where the coefficient may be used to determine a weighted average when determining a centroid of a cluster for use as a spatial indicator. By weighting a coefficient based on a gaze duration to determine a spatial indicator, some embodiments may overcome difficulties in accommodating individual psychological or physiological differences with respect to eye movement.

In some embodiments, operations of the method 400 may include generating a downscaled encoding of a source image based on the one or more sets of spatial indicators, as indicated by block 420. As described above, some embodiments may generate one set of spatial indicators, such as generating by generating a single mask. Alternatively, some embodiments may generate multiple sets of spatial indicators, such as by generating multiple masks with which to apply to a video source. In some embodiments, a downscaled encoding may be generated for each set of spatial indicators. For example, if a system had generated five different masks, some embodiments may generate five different downscaled encodings of a source image, where each respective encoding corresponds with a respective mask.

Video data may be encoded using various types of encodings, where an encoding of a video may include data having a data format that is compatible with one or more applications capable of displaying a version of the video. Video encodings may include the H.264 (sometimes also labeled as a "MPEG-4 Advanced Video Coding"), H.265 encoding, scalable video coding (SVC) encoding, or the like. For example, some embodiments may receive video data from a sending computing device encoded in the H.265 video compression standard. Some embodiments may generate a new encoding from a first encoding of a video file by decoding the first encoding, downscaling the decoded video file using one or more downscaling operations described in this disclosure, and re-encoding the decoded, downscaled video image.

As discussed elsewhere in this disclosure, various methods may be used to downscale an image of a video file. In some embodiments, an interpolation method may be used to downscale one or more video images. For example, some embodiments may use a Lanczos algorithm to downscale images of a video stream being provided by a first computing device, where the downscaled images may then be encoded as a new encoding. Alternatively, or in addition, some embodiments may use a neural network to downscale an image or reconstruct a downscaled image. For example, some embodiments may use a convolutional neural network model, such as the one described by Kaplanyan et al. (Kaplanyan, A. S., Sochenov, A., Leimkühler, T., Okunev, M., Goodall, T. and Rufo, G., 2019. DeepFovea: Neural reconstruction for foveated rendering and video compression using learned statistics of natural videos. ACM Transactions on Graphics (TOG), 38(6), pp. 1-13). Some embodiments may downscale an image by sampling pixels of the image with a binary mask, where the binary mask may indicate which pixels of the image to keep and which pixels of the image to discard in a downscaled image. For example, in some embodiments, an initial N×M binary mask may be generated for an image having the dimensions of N pixels for height and M pixels for width in pixel space, where the N×M binary mask may include a sparse N×M matrix. In some embodiments, an element of the N×M matrix at the position [n, m] may indicate an operation to keep or discard a pixel at the [n, m] position of the image in pixel space. For example, an element value of "1" may indicate that the corresponding pixel is included in the downscaled encoding, and "0" may indicate that the corresponding pixel will be discarded from the downscaled encoding.

A sampling pattern of a mask used to downscale an image may be generated based on the set of physical indicators determined using one or more operations described in this disclosure.

The sampling pattern may include random sampling, a sparse pattern of concentric rings, a low-discrepancy blue noise sequence using a void and cluster algorithm centered around one or more centers, or the like. In some embodiments, a centroid of a cluster of gaze locations or other spatial indicator determined above may be used as a seed value used to generate a pattern. For example, some embodiments may select the centroid position of a cluster of gaze locations as the center of a set of non-zero values of a sparse matrix based on the void and cluster algorithm. The sparse matrix may then be used to generate a downscaled image, where the positions of the non-zero elements of the matrix correspond to pixels that are included in the downscaled image. Alternatively, or in addition, some embodiments may include generating a matrix having one or more concentric circles or rings of non-zero values around a spatial indicator.

Various other types of sparse matrices may be used to downscale an image, where the sparse matrix may be determined based one or more spatial indicators used to determine a set of pixels of an image that should be retained when downscaling a video encoding. For example, some embodiments may transfer every pixel corresponding with the position of a spatial indicator to a downscaled encoding. As another example, some embodiments may select a centroid position of a cluster of future gaze locations as the center of a set of non-zero values of a sparse matrix generated with a void and cluster algorithm. As described elsewhere in this disclosure, the future gaze locations may be predicted from a plurality of gaze scan paths provided by different computing devices. Some embodiments may then downscale an image using a mask based on the centroid position of the cluster of future gaze locations, where the mask includes non-zero elements at a pixel position centered at the spatial indicator and at pixel positions within a pixel space range (e.g., more than 2 pixels, more than 10 pixels, more than 100 pixels, or the like).

Some embodiments may use a neural network, such as a CNN, to generate a sparse matrix usable for downscaling an image. For example, some embodiments may use a first neural network to trained using generative adversarial network training to generate a mask. In some embodiments, the first neural network may be trained using an objective function that causes a system to update the weights of the first neural network based on the reconstruction accuracy of a second neural network.

In some embodiments, a downscaled image may be reconstructed using a convolutional neural network. For example, some embodiments may reconstruct an image from a downscaled image using a CNN, such as a U-Net neural network. In some embodiments, the convolutional neural network may be implemented as an encoder-decoder design with skip connections. For example, a decoder block of the CNN may perform spatial bilinear upsampling after receiving an input, where the input may be an upscaled output of a previous decoder block that has been concatenated with the output of a corresponding encoder block via a skip connection. Some embodiments may send parameters of the neural network used to reconstruct images for a video stream to the video-receiving device. For example, some embodiments may provide a set of weights or activation function parameters of a first set of layers of a neural network to a version of the neural network stored on a video-receiving computing device, where the version of the neural network may then reconstruct an image based on downscaled image data sent to the video-receiving computing device. In some embodiments, the spatial indicators used to generate a downscaled image, such as a gaze location, centroid of a cluster of gaze locations, or predicted future gaze locations may be provided to a computing device and used as additional inputs to the neural network to increase the accuracy of a reconstruction.

Alternatively, or in addition, some embodiments may generate or otherwise update a downscaled encoding from a first encoding by selecting subsets of data of the first encoding to provide as part of a new encoding. For example, some embodiments may receive videos in the SVC format, where the encoding may include a first subset of video data (e.g., a bit stream) that may be used to display video data and a second subset of video data that may be combined with the first subset of video data to increase the resolution of the video images. Some embodiments than then select whether to send only the first subset or both the first and second subset of video data to a video-receiving computing device based on parameters such as a network performance metric. For example, some embodiments may send a first encoding to a video-receiving computing device, the first encoding including a first bit stream that encodes a first set of neural-network-generated images based on a download data rate being less than a threshold. In response to a determination that the download data rate was increased to a value greater than the threshold, some embodiments may send a second encoding to the same video-receiving computing device that includes the first bit stream and a second bit stream that can be combined with the first bit stream by the video-receiving computing device to improve the image resolution or accuracy.

Some embodiments may update an encoding based on a data size of an image of a video image. For example, some embodiments may determine whether the video image's data size is greater or less than a threshold, where the data size may be represented as a number of pixels, a memory size, a resolution and image dimension, or the like. In some embodiments, a determination that the data size is less than the threshold may cause the use of a first type of downscaling method, such as an interpolation method, and a determination that the data size is greater than the threshold may cause the use of a second type of downscaling method, such as a sparse matrix downscaling operation. As described elsewhere in this disclosure, some embodiments may use the downscaled as an input for a reconstruction operation using a neural network. For example, some embodiments may determine that a video file includes an image that is greater than a threshold value of 10 megabytes. In response, some embodiments may use a void and cluster algorithm centered around a set of spatial indicators to generate a downscaled image, which may then be re-encoded and sent to a video-receiving computing device. Some embodiments may reconstruct an image based on the downscaled image with a neural network using operations such as those described in this disclosure.

Some embodiments may determine a display size value for an application window or a display size value of a sub-window of the application, where a video is to be displayed within the sub-window. The display size value may include an area in pixel-space, a height in pixel-space, a width in pixel-space, a volume in voxel space, or the like. Some embodiments may determine a downscaling parameter based on the display size value. For example, some embodiments may increase a downscaling parameter based on a decrease in a display size value such that the amount of data required in an encoding of the video data is decreased. After downscaling a video image to produce a downscaled encoding based on a display size value of a computing device, some embodiments may send the downscaled encoding to the computing device.

In some embodiments, operations of the method 400 may include sending the set of downscaled encodings to the set of receiving devices, as indicated by block 458. In some embodiments, each computing device of the set of video-receiving devices may be associated with a set of spatial indicators. Some embodiments may be associated with a set of spatial indicators via a mask generated from the set of spatial indicators. For example, some embodiments may generate a mask indicating which regions of an image to not downscaled and which regions of an image to downscale based on a set of spatial indicators indicating the regions. Some embodiments may then send the encoding generated with the mask and the source video to each receiving device of a set of computing devices. For example, if a first computing device and a second computing device are both receiving video images from a video-sending device, some embodiments may determine that both computing devices are associated with a first mask used to generate a first encoding of video data provided by a third computing device. Some embodiments may then send the first encoding to each of the first and second computing devices.

In some embodiments, the set of downscaled encodings may include a number of encodings, where each encoding is associated with a different computing device. For example, a first, second, and third computing device may receive video data from a fourth computing device during concurrent video communication sessions. Each of the first, second, and third computing devices may receive different video data encodings from the fourth computing device. Alternatively, in some embodiments, the set of unique downscaled encodings may be fewer in number than the number of computing devices receiving the downscaled encodings. For example, a first, second, and third computing device receiving video data from a fourth computing device during concurrent video communication sessions may receive versions of the same encoding of video data from the fourth computing device.

In some embodiments, as discussed above, an encoding being sent to the set of computing devices may be switched to a different encoding or otherwise updated based on one or more criteria being satisfied. For example, the encoding being sent to a computing device may be modified based on a network parameter or a computing performance metric, such as an upload rate or a computing capability. Some embodiments may determine that an upload data rate of a video-providing computing device has satisfied an upload rate threshold. In response, some embodiments may switch video data being sent to a computing device from a first downscaled encoding of video data to a second downscaled encoding of video data. In such cases, the first downscaled encoding may use more data to encode an image than the second downscaled encoding uses to encode the same image. For example, some embodiments may determine that the upload data rate of mobile computing device has fallen below a threshold value of 1 gigabit per second, thus satisfying an upload rate threshold. In response, some embodiments may change a modify a downscaling operation. Various types of modifications to the downscaling operation may be performed. For example, some embodiments may increase the number of iterations of a downscaling operation, which may change a downscaling operation from a cubic operation to a neural-network-based operation. Alternatively, or in addition, some embodiments may reduce the number of non-zero elements in a sparse matrix used to generate a downscaled encoding.

In some embodiments, the various computers and subsystems illustrated in FIG. 1 or FIG. 3 may include one or more computing devices that are programmed to perform the functions described herein. The computing devices may include one or more electronic storages (e.g., database(s) 132, which may include downscaling model database(s) 136, profile database(s) 138, etc., or other electronic storages), one or more physical processors programmed with one or more computer program instructions, and/or other components. The computing devices may include communication lines or ports to enable the exchange of information with one or more networks (e.g., network(s) 150) or other computing platforms via wired or wireless techniques (e.g., Ethernet, fiber optics, coaxial cable, WiFi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory, computer-readable storage media that electronically stores information. The storage media of the electronic storages may include one or both of (i) system storage that is provided integrally (e.g., substantially non-removable) with servers or user devices; or (ii) removable storage that is removably connectable to the servers or user devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from user devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units.

These processing units may be physically located within the same device, or the processors may represent processing functionality of a plurality of devices operating in coordination. The processors may be programmed to execute computer program instructions to perform functions described herein of subsystems or other components. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems or other components described herein is for illustrative purposes, and is not intended to be limiting, as any of subsystems other components may provide more or less functionality than is described. For example, one or more of subsystems may be eliminated, and some or all of its functionality may be provided by other ones of the subsystems.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment may be combined with one or more features of any other embodiment.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the context clearly indicates otherwise. Thus, for example, reference to "an element" includes a combination of two or more elements, notwithstanding use of other terms and phrases for one or more elements, such as "one or more." The term "or" is non-exclusive (i.e., encompassing both "and" and "or"), unless the context clearly indicates otherwise. Terms describing conditional relationships (e.g., "in response to X, Y," "upon X, Y," "if X, Y," "when X, Y," and the like) encompass causal relationships in which the antecedent is a necessary causal condition, the antecedent is a sufficient causal condition, or the antecedent is a contributory causal condition of the consequent (e.g., "state X occurs upon condition Y obtaining" is generic to "X occurs solely upon Y" and "X occurs upon Y and Z"). Such conditional relationships are not limited to consequences that instantly follow the antecedent obtaining, as some consequences may be delayed, and in conditional statements, antecedents are connected to their consequents (e.g., the antecedent is relevant to the likelihood of the consequent occurring). Statements in which a plurality of attributes or functions are mapped to a plurality of objects (e.g., one or more processors performing steps/operations A, B, C, and D) encompasses both all such attributes or functions being mapped to all such objects and subsets of the attributes or functions being mapped to subsets of the attributes or functions (e.g., both all processors each performing steps/operations A-D, and a case in which processor 1 performs step/operation A, processor 2 performs step/operation B and part of step/operation C, and processor 3 performs part of step/operation C and step/operation D), unless otherwise indicated. Further, unless otherwise indicated, statements that one value or action is "based on" another condition or value encompass both instances in which the condition or value is the sole factor and instances in which the condition or value is one factor among a plurality of factors. Unless the context clearly indicates otherwise, statements that "each" instance of some collection have some property should not be read to exclude cases where some otherwise identical or similar members of a larger collection do not have the property (i.e., each does not necessarily mean each and every). Limitations as to sequence of recited steps should not be read into the claims unless explicitly specified (e.g., with explicit language like "after performing X, performing Y") in contrast to statements that might be improperly argued to imply sequence limitations, (e.g., "performing X on items, performing Y on the X'ed items") used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless the context clearly indicates otherwise, it is appreciated that throughout this specification discussions utilizing terms such as "processing," "computing," "calculating," "determining" or the like refer to actions or processes of a specific apparatus, such as a special purpose computer or a similar special purpose electronic processing/computing device. As used in this application, updating data may include modifying data already stored in a storage or creating the data and storing the newly-created data in storage.

The present techniques will be better understood with reference to the following enumerated embodiments:

1. A method comprising: receiving a set of positions from a set of computing devices during concurrent video communication sessions between the set of computing devices and a sending computing device that is providing a first image; determining a collection of positions based on the set of positions; determining a spatial indicator based on the collection of positions; generating a downscaled encoding of the first image by downscaling a portion of the first image that does not comprise the spatial indicator; and sending the downscaled encoding to the set of computing devices during the concurrent video communication sessions.

2. The method of embodiment 1, further comprising: receiving a first indicator that a first computing device of the set of computing devices is uploading prioritized content; and updating a downscaling parameter in response to receiving the first indicator, wherein the updating of the downscaling parameter causes a first version of the downscaled encoding to require less memory than a previous version of the downscaled encoding.

3. The method of any of embodiments 1 to 2, further comprising determining a data size of the first image, wherein generating the downscaled encoding is based on the data size of the first image.
4. The method of any of embodiments 1 to 3, further comprising obtaining a display size value indicating a length, width, area, or volume of a user interface element, wherein downscaling comprises downscaling based on the display size value.
5. The method of any of embodiments 1 to 4, further comprising: receiving a first position from a first computing device; determining whether the first position is encompassed by any region of the first image; and in response to a determination that the first position is not encompassed by any region of the first image, stopping a transmission of data based on the first image to the first computing device.
6. The method of any of embodiments 1 to 5, wherein a first position of the set of positions is determined using a convolutional neural network.
7. The method of any of embodiments 1 to 6, wherein the set of positions comprises a set of gaze locations; determining the collection of positions comprises determining a first collection of positions and a second collection of positions based on the set of gaze locations; determining the spatial indicator comprises determining a first set of spatial indicators comprising a first spatial indicator based on the first collection of positions and a second set of spatial indicators comprising a second spatial indicator based on the second collection of positions, the first spatial indicator comprising a position or a bounded region; generating the downscaled encoding comprises generating a first downscaled encoding of the source image based on the first set of spatial indicators by downscaling a portion of the source image that does not comprise the first spatial indicator; the method further comprises generating a second downscaled encoding of the source image based on the second set of spatial indicators by downscaling a portion of the source image that does not comprise the second spatial indicator; and wherein sending the downscaled encoding comprises sending the first downscaled encoding to a first subset of the set of computing devices and the second downscaled encoding to a second subset of the set of computing devices during the concurrent video communication sessions.
8. The method of any of embodiments 1 to 7, wherein: the set of gaze locations comprises a first sequence of gaze locations from a first computing device of the set of computing devices and a second sequence of gaze locations from a second computing device of the set of computing devices; the first sequence of gaze locations and the second sequence of gaze locations are ordered in time; determining the first set of spatial indicators comprises: predicting a first future gaze location based on the first sequence of gaze locations; predicting a second future gaze location based on the second sequence of gaze locations; determining a third spatial indicator based on a centroid of a cluster comprising the first future gaze location and the second future gaze location; and downscaling the portion of the source image comprises retaining a set of pixels within a pixel space range of the third spatial indicator in the first downscaled encoding.
9. The method of any of embodiments 1 to 8, wherein determining the first set of spatial indicators comprises determining an initial plurality of regions, and wherein the operations further comprise: ranking the initial plurality of regions based on a count of positions encompassed by each respective region of the initial plurality of regions; and selecting a region of the initial plurality of regions as the first spatial indicator based on the ranking, wherein generating the first downscaled encoding comprises generating the first downscaled encoding based on the selected region.
10. The method of any of embodiments 1 to 9, the operations further comprising sending the set of spatial indicators to the sending computing device, wherein generating the downscaled encoding comprises generating the downscaled encoding using the sending computing device.
11. The method of any of embodiments 1 to 10, the operations further comprising: collecting the source image from a first computing device of the set of computing devices at a server, wherein the set of computing devices does not comprise the server, and wherein: determining the first set of spatial indicators comprises determining the first set of spatial indicators using the server; and sending the first downscaled encoding to the set of computing devices comprises sending the first downscaled encoding from the server.
12. The method of any of embodiments 1 to 11, the operations further comprising: collecting the source image from a first computing device of the set of computing devices at a second computing device, wherein the set of computing devices comprises the first computing device and the second computing device, and wherein: determining the first set of spatial indicators comprises determining the first set of spatial indicators using the second computing device; and sending the first downscaled encoding to the set of computing devices comprises sending the first downscaled encoding from the second computing device.
13. The method of any of embodiments 1 to 12, the operations further comprising: determining whether the source image comprises a section of text; and updating the first set of spatial indicators to comprise a second region that encompasses the section of text in response to a determination that the section of text is in the source image.
14. The method of any of embodiments 1 to 13, wherein generating the first downscaled encoding comprises: determining a first output of a first layer of a neural network; providing the first output as a first input of a second layer of the neural network to determine a second output; providing the first output as a second input of a third layer of the neural network to determine a third output, wherein the third layer receives, as another input, an output based on the second output; and generating the first downscaled encoding based on the third output.
15. The method of any of embodiments 1 to 14, wherein a gaze location of the set of gaze locations is associated with a gaze duration, and wherein determining the first set of spatial indicators comprises performing a computation based on the gaze duration.
16. The method of any of embodiments 1 to 15, wherein the set of positions comprises a first gaze location from a first receiving computing device, a second gaze location from a second receiving computing device, a third gaze location from a third receiving computing device, and a fourth gaze location from a fourth receiving computing device during concurrent video communication sessions between the first, second, third, and fourth receiving computing devices and a sending computing device that is providing a source image, and wherein the set of computing devices comprises the first, second, third, and fourth receiving computing devices; determining the collection of positions comprises determining a first cluster of gaze locations and a second cluster of gaze locations, the first cluster of gaze locations comprising the first gaze location and the second gaze location, the second cluster of gaze locations comprising the third gaze location and the fourth gaze location; determining the spatial indicator comprises generating a first mask comprising a first region based on the first cluster of gaze locations and a second mask comprising a second region based on the second cluster of gaze locations; generating the downscaled encoding comprises generating a first downscaled encoding of the source image based on the first mask by downscaling a third region of the source image outside of the first region and a second downscaled encoding of the source image based on the second mask by downscaling a fourth region of the source image outside of the second region; and sending the downscaled encoding comprises sending the first downscaled encoding to the first and second receiving computing devices and the second downscaled encoding to the third and fourth receiving computing devices during the concurrent video communication sessions.

17. The method of any of embodiments 1 to 16, the operations further comprising: obtaining an upper bound of an upload data rate of the sending computing device; determining a required data rate of a set of encodings comprising the first downscaled encoding and the second downscaled encoding; and determining whether the required data rate satisfies a data amount threshold that is based on the upper bound of the upload data rate, wherein sending the first downscaled encoding comprises sending the first downscaled encoding in response to a determination that the required data rate satisfies the data amount threshold based on the upper bound of the upload data rate.

18. The method of any of embodiments 1 to 17, the operations further comprising determining a download data rate of the first receiving computing device during the concurrent video communication sessions, wherein generating the first mask comprises: setting a dimension for the first region based on the download data rate; and generating the first mask based on the dimension of the first region.

19. The method of any of embodiments 1 to 18, wherein: receiving the first gaze location comprises receiving a plurality of gaze locations from the first receiving computing device, each respective gaze location being associated with a gaze duration; and determining the first cluster of gaze locations comprises: determining whether a first gaze duration associated with the first gaze location satisfies a gaze duration threshold; and in response to a determination that the first gaze location satisfies the gaze duration threshold, selecting a gaze location of the plurality of gaze locations for use as the first gaze location, the first cluster of gaze locations comprising the gaze location.

20. The method of any of embodiments 1 to 19, wherein the first mask comprises a first two-dimensional position, and wherein the second mask comprises a second two-dimensional position, and wherein the first two-dimensional position is different from the second two-dimensional position.

21. The method of any of embodiments 1 to 20, further comprising generating a reconstructed image using a neural network based on the downscaled encoding of the first image.

22. A non-transitory, computer-readable media storing instructions that, when executed by one or more processors, effectuate operations comprising those of any of embodiments 1 to 21.

23. A system comprising: one or more processors; and memory storing instructions that, when executed by the processors, cause the processors to effectuate operations comprising those of any of embodiments 1 to 21.

What is claimed is:

1. A method for facilitating video communication by predicting shared locations during a concurrent video presentation, comprising:
   receiving a first sequence of gaze locations from a first receiving computing device and a second sequence of gaze locations from a second receiving computing device during concurrent video communication sessions between the first and second receiving computing devices and a presenting computing device;
   predicting a shared location based on the first sequence of gaze locations and the second sequence of gaze locations;
   generating a mask comprising a first region based on the shared location, wherein the first region does not include the shared location;
   generating, based on the mask, a downscaled encoding of a source image from the presenting computing device by downscaling the source image at the first region of the source image; and
   sending the downscaled encoding to the first receiving computing device and the second receiving computing device.

2. The method of claim 1, wherein predicting the shared location comprising:
   determining a first future gaze location based on the first sequence of gaze locations;
   determining a second future gaze location based on the second sequence of gaze locations;
   determining a centroid based on the first and second future gaze locations; and
   determining the shared location based on the centroid.

3. The method of claim 2, wherein predicting the shared location comprising:
   obtaining a user record associated with the first sequence of gaze locations, wherein the user record stores a plurality of gaze scanpaths; and
   training a neural network based on the plurality of gaze scanpaths to predict future scanpath predictions, wherein determining the first future gaze location comprises determining the first future gaze location using the neural network.

4. The method of claim 1, further comprising determining whether a data rate of the downscaled encoding satisfies a data rate threshold, wherein sending the downscaled encoding comprises sending the downscaled encoding in response to a determination that the data rate satisfies the data rate threshold.

5. The method of claim 4, further comprising determining the data rate of the downscaled encoding by determining an upload rate of the presenting computing device.

6. One or more tangible, non-transitory, machine-readable media storing instructions that, when executed by one or more processors, effectuate operations comprising:
    receiving a first set of screen positions from a first receiving computing device and a second set of screen positions from a second receiving computing device during concurrent video communication sessions between the first and second receiving computing devices and a presenting computing device;
    predicting a shared position based on the first set of screen positions and the second set of screen positions;
    generating a downscaled encoding of a source image from the presenting computing device by downscaling the source image at a set of regions of the source image, wherein the set of regions does not comprise the shared position; and
    sending the downscaled encoding to the first receiving computing device and the second receiving computing device.

7. The media of claim 6, wherein:
    the first receiving computing device determines a first set of head orientations and a first set of eye measurements to determine the first set of screen positions; and
    the second receiving computing device determines a second set of head orientations and a second set of eye measurements to determine the second set of screen positions.

8. The media of claim 6, wherein:
    receiving the first set of screen positions comprises receiving categorical indicators associated with the first set of screen positions; and
    each respective indicator of the categorical indicators indicates whether a respective screen position of the first set of screen positions is associated with a saccade position or a gaze position; and
    predicting the shared position comprises determining the shared position based on the categorical indicators.

9. The media of claim 6, wherein predicting the shared position comprises:
    determining a set of density-based clustering values based on a cluster of screen positions comprising the first set of screen positions and the second set of screen positions; and
    determining the shared position based on the set of density-based clustering values.

10. The media of claim 6, wherein:
    each respective screen position of the first set of screen positions and the second set of screen positions is associated with a respective measurement time of a set of measurement times; and
    predicting the shared position comprises providing a machine learning model with the set of measurement times to determine the shared position.

11. The media of claim 6, the operations further comprising receiving a third screen position from a third receiving computing device during the concurrent video communication sessions, wherein:
    the concurrent video communication sessions comprise a communication session between the third receiving computing device and the presenting computing device; and
    predicting the shared position comprises predicting the shared position based on the third screen position.

12. The media of claim 11, wherein the downscaled encoding is a first downscaled encoding, and wherein the source image is a first source image, and wherein the set of regions is a first set of regions, the operations further comprising:
    receiving a fourth screen position from the first receiving computing device;
    receiving a fifth screen position from the second receiving computing device;
    receiving a sixth screen position from the third receiving computing device;
    determining that the sixth screen position exceeds a screen boundary;
    predicting a second shared position based on an additional set of screen positions, wherein the additional set of screen positions comprises the fourth screen position and the fifth screen position, and wherein the additional set of screen positions does not comprise the sixth screen position; and
    generating a second downscaled encoding of a second source image from the presenting computing device by downscaling the second source image at a second set of regions of the source image, wherein the second set of regions does not comprise the second shared position; and
    sending the second downscaled encoding to the first receiving computing device and the second receiving computing device.

13. The media of claim 6, wherein downscaling the source image at a set of regions of the source image comprises interpolating a set of pixel color values of the source image.

14. A system comprising:
    one or more processors; and
    memory storing computer program instructions that, when executed by the one or more processors, cause the one or more processors to effectuate operations comprising:
        obtaining a first set of screen positions associated with a first receiving computing device and a second set of screen positions associated with a second receiving computing device during concurrent video communication sessions between a presenting computing device and the first and second receiving computing devices;
        predicting a shared position based on the first set of screen positions and the second set of screen positions;
        downscaling a source image from the presenting computing device at a set of regions of the source image to generate a downscaled encoding, wherein the set of regions does not comprise the shared position; and
        sending the downscaled encoding to the first receiving computing device and the second receiving computing device.

15. The system of claim 14, wherein the set of regions is a first set of regions, wherein predicting the shared position comprises:
    detecting a set of features in the source image; and
    generating a second set of regions corresponding to the set of features, wherein the first set of regions does not comprise the second set of regions.

16. The system of claim 15, wherein detecting the set of features comprises:
    receiving a first indication that the source image is being displayed;
    in response to receiving the first indication, providing the source image to as an input to a neural network; and
    indicating the set of features based on an output of the neural network.

17. The system of claim 15, wherein detecting the set of features in the source image comprises:
- determining a presentation category associated with the source image;
- selecting a first set neural network model parameters based on the presentation category; and
- detecting the set of features in the source image using the first set neural network model parameters.

18. The system of claim 15, wherein the set of features comprises text of the source image.

19. The system of claim 14, wherein:
- obtaining the first set of screen positions comprises obtaining a first stored set of screen positions of a first user associated with the first receiving computing device;
- obtaining the second set of screen positions comprises obtaining a second stored set of screen positions of a second user associated with the second receiving computing device;
- training a first neural network model to predict a first set of future screen positions based on the first stored set of screen positions; and
- training a second neural network model to predict a second set of future screen positions based on the second stored set of screen positions, wherein predicting the shared position comprises:
  - predicting a first predicted position using the first neural network model after the training of the first neural network model;
  - predicting a second predicted position using the second neural network model after the training of the second neural network model; and
  - determining the predicted shared position based on the first and second predicted positions.

20. The system of claim 14, wherein generating the downscaled encoding comprises:
- determining a set of values representing pixel data of the source image;
- providing the set of values to a first convolutional neural network layer as an input of the first convolutional neural network;
- using a first layer output of the first convolutional neural network layer as an input for a second convolutional neural network layer;
- using both a second layer output of the second convolutional neural network layer and the first layer output as inputs for a third convolutional neural network layer; and
- generating the downscaled encoding based on an output of the third convolutional neural network layer.

* * * * *